US000001385H

United States Statutory Invention Registration [19]

[11] Reg. Number: H1385

Stickel et al. [43] Published: Dec. 6, 1994

[54] HIGH SPEED COMPUTER APPLICATION SPECIFIC INTEGRATED CIRCUIT

[75] Inventors: Karl D. Stickel; Sam T. Tuey; Michael J. Gibeault, all of Ridgecrest, Calif.

[73] Assignee: The United States of America as represented by the Secretary of the Navy, Washington, D.C.

[21] Appl. No.: 779,426

[22] Filed: Oct. 18, 1991

[51] Int. Cl.[5] ..... G06F 7/00
[52] U.S. Cl. ..... 395/800; 395/375
[58] Field of Search ..... 395/375, 800

[56] References Cited

U.S. PATENT DOCUMENTS

| | | | |
|---|---|---|---|
| 4,794,521 | 12/1988 | Ziegler et al. | 395/425 |
| 4,984,151 | 1/1991 | Dujari | 395/775 |
| 4,989,113 | 1/1991 | Hull, Jr. et al. | 395/425 |
| 5,265,005 | 11/1993 | Schmidt et al. | 364/147 |

*Primary Examiner*—Bernarr E. Gregory
*Attorney, Agent, or Firm*—John L. Forrest, Jr.; Melvin J. Sliwka; Harvey A. Gilbert

[57] ABSTRACT

An integrated circuit chip for application in a computer for performing high speed arithmetic operations in hardware has hardware for forming a system clock processor circuit, a timer circuit, a program counter and branching circuit; an interrupt processor circuit formed in the chip; an interrupt address random access memory, mathematical computation circuitry and an internal data random access memory. The mathematical computation circuitry includes a circuit for performing combined division and square root operations. The integrated circuit operates on a fixed instruction set and provides the means for performing instruction and operand look-ahead to permit execution of each instruction in a single clock cycle.

6 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HIGH SPEED COMPUTER APPLICATION SPECIFIC INTEGRATED CIRCUIT

BACKGROUND OF THE INVENTION

This invention relates generally to high speed computer processing circuitry and particularly to high speed microcomputer circuitry that has low power consumption, provides powerful mathematical processing and which may be programmed with a high level language structure at the assembly code level. Still more particularly, this invention relates to an application specific integrated circuit that may be included in a computer system.

The previous method of achieving high speed operation in a processor is by microprogramming very primitive instruction fields. In such processors the execution of interrupts and branching instructions always takes more than one clock cycle. The software design effort and difficulty level increases if the instruction set is made up of primitive commands. In the order of programming ease, the high-level language is the preferred choice, followed by assembly language, the reduced instruction set computer (RISC) instructions, and the microprogram language.

Prior art processors do not perform divide and square root operations in hardware. The prior art processors accomplish division calculations with software, which is time consuming. Conventional microprocessor access look up tables or software codes for square root calculations, which is also time-consuming.

SUMMARY OF THE INVENTION

The invention provides a microcomputer with the desirable characteristics of small size, fast throughout rate, low power consumption, powerful mathematical processing, and high level language structure at the assembly code level. The microcomputer is formed as a high speed computer application specific integrated circuit.

The microcomputer according to the present invention creates a high level language format by building in an instruction decoded to generate the microprogram control fields. This unique design provides a high level language environment, maximum speed, and single instruction execution per instruction cycle. Single-clock instruction execution, including branching and interrupt, improves processor speed. This type of execution is an improvement over all microprocessors that require several clock cycles to execute an instruction. The processor according to the present invention combines instruction look ahead and the correct pipeline length, it only needs one clock cycle to perform branching and process interrupt requests.

The present invention uses a harvard architecture processor implemented with the best features of reduced instruction set computer (RISC) and complex instruction set computer (CISC) machines. The processor is designed for high speed data manipulation and branching with a simple but powerful instruction set. The Harvard architecture separates the instruction and data buses to eliminate the bus bottleneck problem of all single bus microprocessors. The present invention has one program bus for instruction and three data buses for data. The buses allow parallel operation to increase execution speed. The present invention provides a fixed instruction-set machine that has the programming language environment of a CISC and the execution speed of a RISC. The instruction used in the present invention set is similar to the BASIC language, which is an improvement over the assembly language environment of all microprocessors (CISC machines), the simple instruction set environment of RISC machines that require multiple instruction to do a CISC command, and the bit-level manipulation of microprogrammed processors.

The ASIC incorporates the necessary internal circuitry to execute the following mathematical operations in hardware: multiplication, division, and square root calculation. The present invention preferably provides $16\times16$ bit multiplication, which produces a 32 bit output; division of a 32 bit numerator by a 16 bit denominator; 16-bit radicand square root calculation; a 16 bit arithmetic logical unit (ALU); and a 32 bit barrel shifter. This hardware implementation of mathematical operations allows the execution of mathematical functions with corresponding software instructions rather than constructing a software algorithm. The hardware execution of mathematical functions is much faster than software algorithms.

The processor according to the present invention has several advantages over conventional microprocessors. The invention has an instruction set that is a high level language format and can execute mathematical equations much faster than conventional microprocessors. The division, square root and multiplication speeds of the conventional microprocessor are also severely limited by software implementation of the complex mathematical instructions. The more powerful mathematical capability of the present invention allows for the implementation of complex functions at significantly higher speed.

The present invention has a much more advanced interrupt processor and timer section than a conventional microprocessor or microcomputer. The interrupt processor can accommodate 23 separate external interrupts. The interrupt processor preferably contains two 12-bit mask registers to individually mask each interrupt input or globally disable all interrupt inputs. The interrupt processor works on a queue system. The interrupt processor assigns a unique priority to each interrupt so that no two interrupts have the same priority. The present invention contains a dedicated internal interrupt address RAM. This internal interrupt address RAM is user programmable and contains the addresses of the first instruction for each of the 23 interrupt service routines.

The timer section of the HSC ASIC consists of six 16-bit up counters and six 16-bit threshold latches. Each up counter (timer) is paired with a threshold latch. The data outputs of each timer/latch pair are compared with a dedicated digital comparator. The output of the comparator is asserted if the timer value is greater than or equal to the corresponding latch value. The comparator outputs are connected to output pins of the SIC for system use.

The timers are controlled by a 6-bit timer control register and the timers are clocked by a separate clock input to the HSC ASIC. All of the timers, threshold latches, and timer control register are mapped into the source and destination address space of the HSC ASIC; therefore, each of them can be written to or read from.

DESCRIPTION OF THE PREFERRED EMBODIMENT

Figure 1:
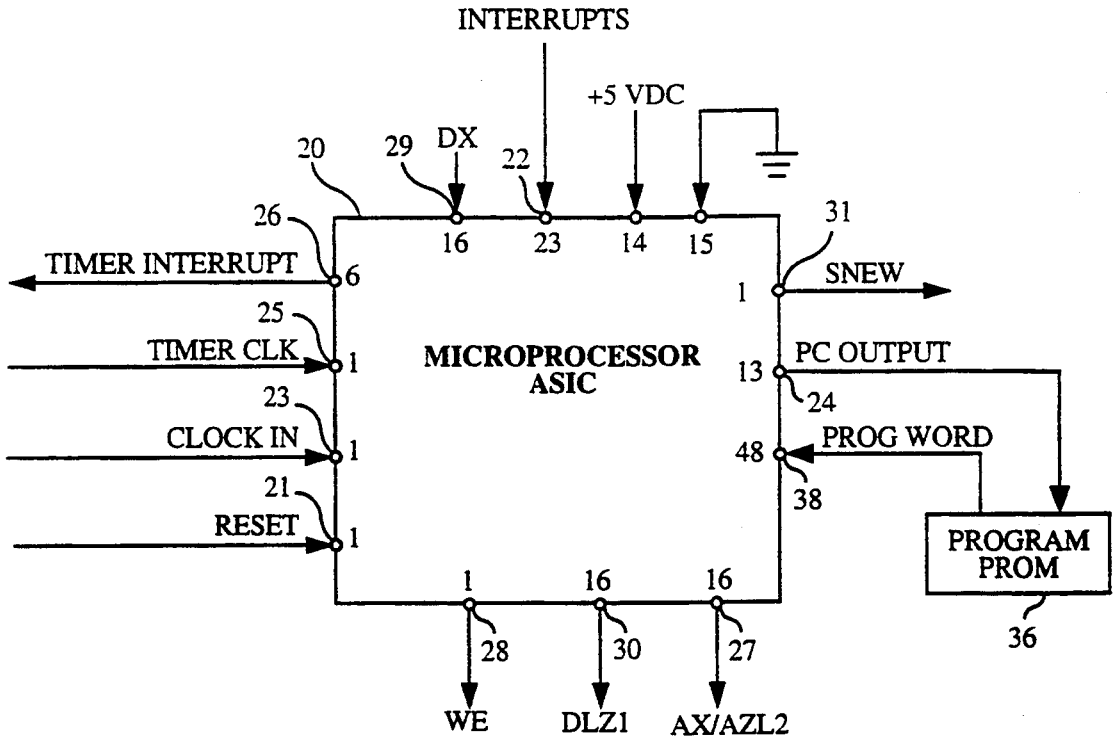
FIG. 1 is a pin diagram of an application specific integrated circuit according to the present invention.

FIG. 1 illustrates a functional pin arrangement for a microprocessor application specific integrated circuit (ASIC) 20 according to the present invention. The ASIC 20 includes a RESET terminal 21 for receiving a rest signal that is asserted upon system power-up for times greater than or equal to six system clock (clock in) periods. The reset signal initiates various reset functions within the ASIC 20 as described subsequently. The ASIC 20 receives data inputs from external data sources, (RAM and ROM) and sends data outputs to the external RAM, and other external data processing circuitry.

The software is interrupt-driven. In a preferred embodiment, the ASIC 20 has-twenty three separate interrupt inputs that may be input to an INTERRUPT terminal 22. These interrupts preferably are edge-activated and asserted high. In the preferred embodiment, an external source (not shown) requesting an interrupt must keep the interrupt signal input asserted for a minimum of 1.5 Clock In periods.

Figure 2:
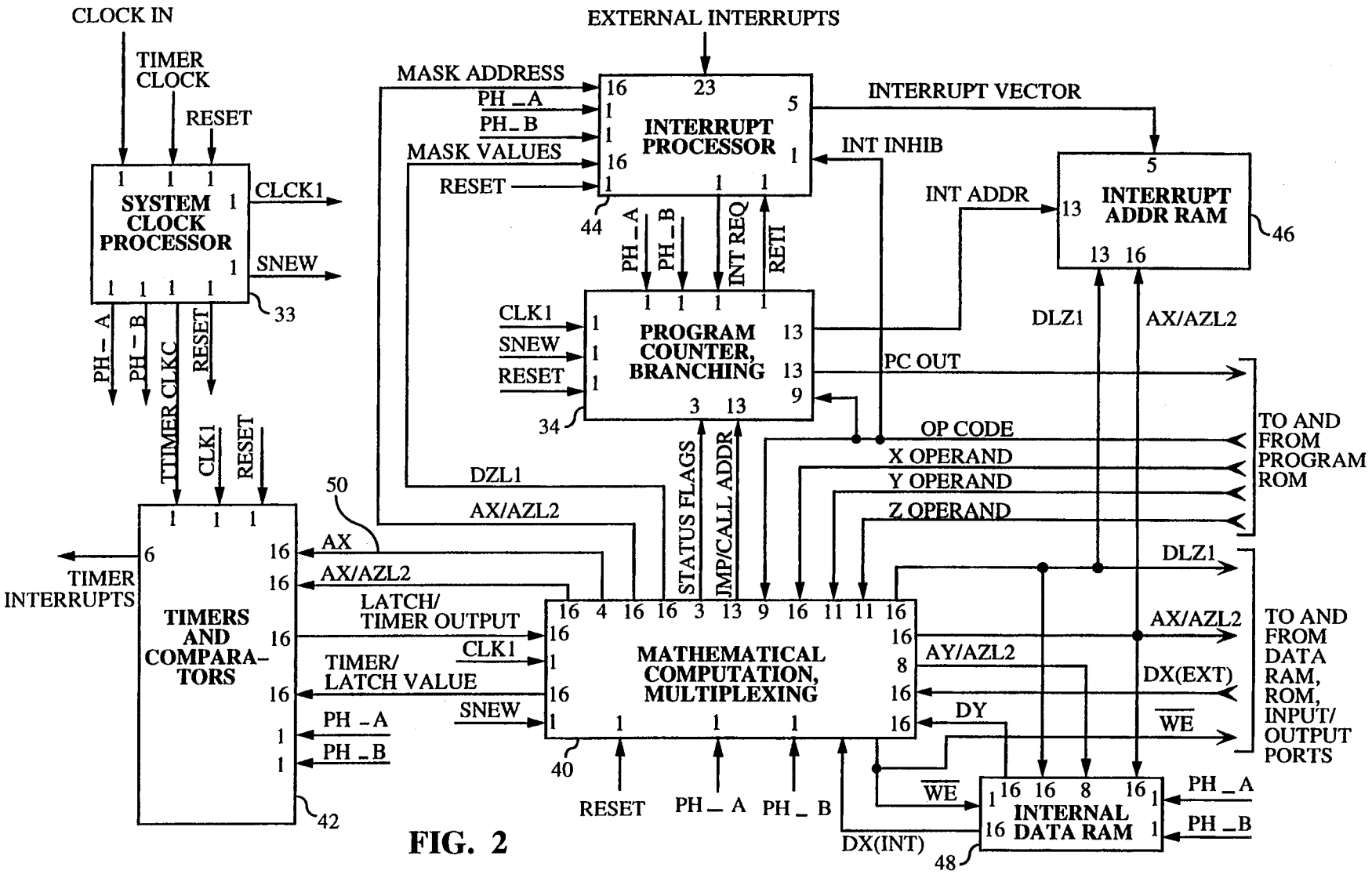
FIG. 2 is a block diagram showing connections between the basic components that comprise the ASIC of FIG. 1.

The ASIC 20 has a CLOCK IN terminal 23 that provides an input for a clock signal that will be processed by an internal system clock processor 33 shown in FIG. 2. The output from this system clock processor 33 will clock a program counter 34, also shown in FIG. 2, and determine the rate at which instructions will be executed. The frequency of CLOCK IN signals should be two times the desired rate at which the fastest instructions will be executed.

Referring again to FIG. 1, the output of the program counter 34 appears at a PC output terminal 24 for driving the address ports of an external program programmable read-only memory (PROM) 36. The PROM 36 is connected to a terminal 38 of the ASIC 20 via a program word bus, which contains the two source-operand addresses, the destination address and the opcode for the instruction set.

The ASIC 20 has a TIMER CLK terminal 25 that receives timer clock signals for driving internal timer clock inputs. The ASIC 20 further includes 6 TIMER INTERRUPT terminals 26. The timer interrupt signals are outputs from individual timers (not shown) included in the ASIC 20. A latch corresponds to each timer. Each interrupt output will be asserted when the value of the timer is greater than or equal to the value in the corresponding latch.

An address bus terminal 27 is connected to a multiplexed address bus AX/AZL2 that provides the destination address for the computed result and the source address for the X operand on alternate cycles of CLOCK IN signals.

The ASIC 20 has has an output terminal 28 for providing output write enable signals WE(L) that may be used to drive the write enable input of external random access memories (not shown). The write enable signals are asserted low. A WE(L) signal is output during a portion of the time when the destination address is on the AX/AZL2 address bus.

Still referring to FIG. 1, a terminal 29 is connected to a data bus DX, which provides means for inputting data for one of two source operands for an arithmetic instruction. The data bus DX preferably is a 16 bit data bus.

A terminal 30 is connected to an output data bus DZL1 that contains the result of an arithmetic operation performed by the ASIC 20.

An output terminal 31 provides a SNEW signal whose period is equal to the instantaneous execution rate of the ASIC 20. The fastest instructions can be executed at one-half the frequency of the CLOCK IN signals. Slower instructions, such as divide and square root, will require multiple cycles of the CLOCK IN signals. The internal circuitry of the ASIC 20 will be clocked at less than one-half the frequency of CLOCK IN to accommodate slow instructions. These slow instructions cause the SNEW signal to become in integral submultiple of the CLOCK IN frequency. The SNEW signal is internally generated to clock the program counter 34. Externally, the SNEW signal serves as an indication of the actual execution of the instruction. Each cycle of the SNEW signal indicates that another instruction is being executed.

Referring to FIG. 2, the ASIC 20 can be internally subdivided into the following subunits: the system clock processor 33, the program counter and branching circuitry 34; an internal bus structure; mathematical computation circuitry and multiplexing circuitry 40; a timer and comparator block 42; an interrupt processor 44; an interrupt address RAM 46 and an internal data RAM 48. FIG. 2 shows these subunits and their interrelationships in a general block diagram of the ASIC 20.

The system clock processor 33 provides signals to the program counter and branching circuitry 34, the mathematical computation circuitry and multiplexing circuitry 40, the timer and comparator block 42, the interrupt processor 44, interrupt address RAM 46 and the internal data RAM 48.

The mathematical computation circuitry and multiplexing circuitry 40 receives signals from the system clock processor 33, the program PROM 36, the timer and comparator block 42, the internal data RAM 48 and external RAM and ROM (not shown). The mathematical computation circuitry and multiplexing circuitry 40 provides signals to the program counter and branching circuitry 34, the timer and comparator block 42, the interrupt processor 44, the interrupt address RAM 46, the internal data RAM 48 and the external RAM and ROM.

The frequency of the internal system clock (CLK 1) will be as close to 10 MHz as possible. An internal clock processor will use one external clock signal to generate a two-phase, non-overlapping clock signals. This pair of clock signals is referred to as CLK1 and $\overline{CLK1}$. CLK1 and $\overline{CLK1}$ are always one-half the frequency of CLOCK IN. CLOCK IN also generates two internal clock signals called PH_A and PH_B, which have the same frequency as CLOCK IN, and clock all of the computer's internal latches. PH_A has the same phase as CLOCK IN, and PH_B is the inverse of PH_A.

The system clock processor 33 receivers the CLOCK IN, TIMER CLOCK and RESET signals. Two external digital clock signals (CLOCK IN and TIMER CLK) are required for operation of the microprocessor 20. These signals are input to the system clock processor 33 as shown in FIG. 2.

The TIMER CLK has a much lower frequency than CLOCK IN. The timer clock may be asynchronous to the system clock since synchronization takes place internally. The period of the timer clock should be greater than 16 CLOCK IN periods or 8 CLK1 periods with a high time of more than 6 CLK1 periods or 12 CLOCK IN periods.

The ASIC 20 preferably has four internal data buses and five internal address buses. The four data buses are referred to herein as DX, DY, DZ and DZL1. The data buses DX and DY are used as source-operand data buses. DZ is the data bus that contains the result of a computational operation upon the DX and DY data. The data bus DZL1 is a latched version of DZ that appears one clock cycle after DZ. It is 16 bits wide and appears at the I/O pads of the ASIC 20.

The internal address buses are referred to herein as AX, AY, AXL1, AX/AZL2, and AY/AZL2. The address buses AX and AY contain either the addresses of the source operands or the data for computations. AZL1 contains the destination address of the data on DZ.

AZL1 appears one clock cycle later in time than AX and AY. This is indicated by the "L1" in the acronym AZL1. AZL2 is a latched version of AZL1 that appears one clock cycle after AZL1. AZL2 and AX are multiplexed during each clock cycle and sent off chip to external components on a 16-bit address bus referred to as AX/AZL2.

The AY/AXZL2 address bus is handled in a manner similar to that described above for the AX/AZL2 address bus. The AY/AXZL2 address bus is 8 bits wide, but it is connected only to the internal data RAM 48.

Figure 5:
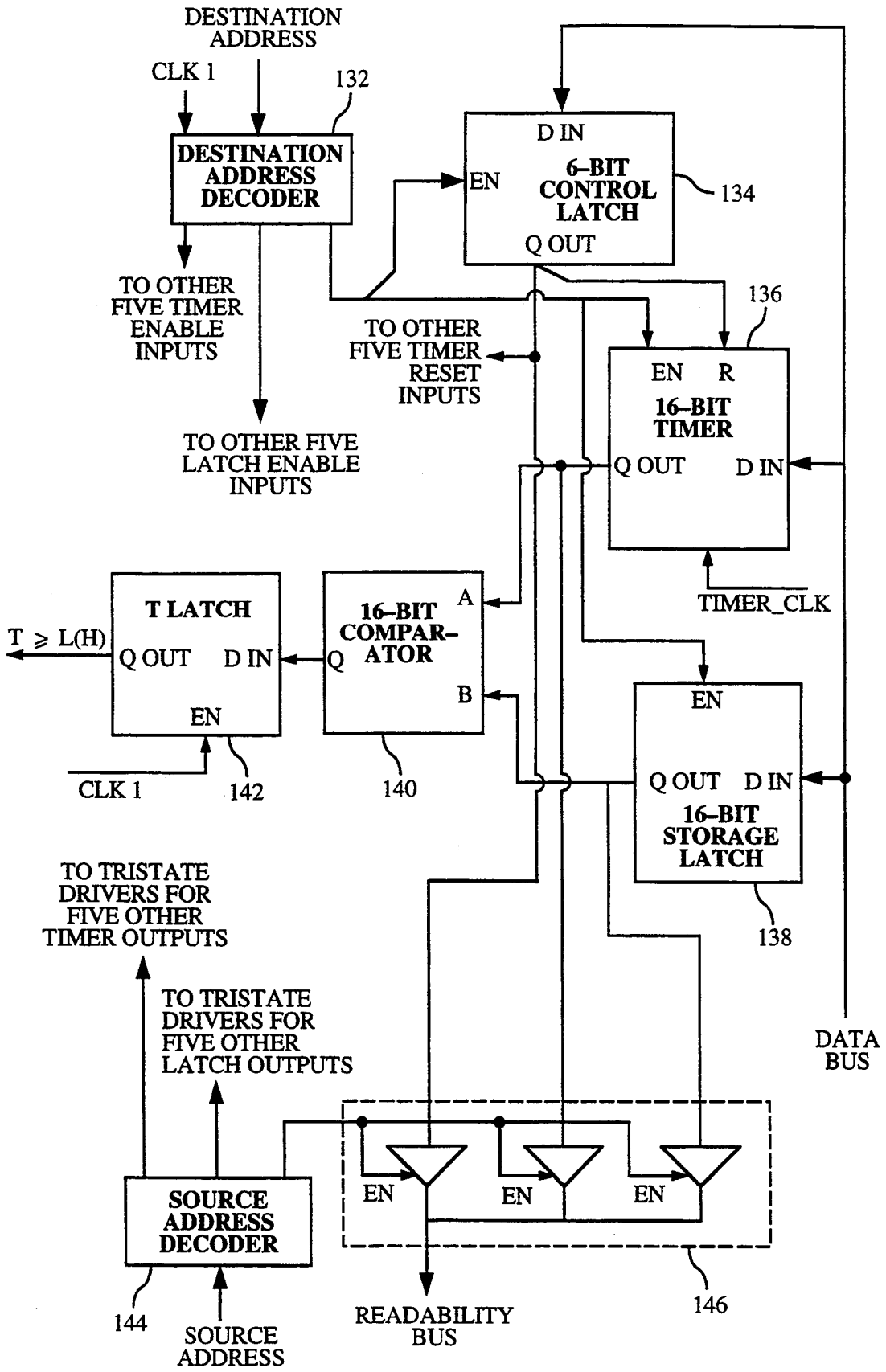
FIG. 5 illustrates the logical relationship between a timer latch pair that may be included in the circuit of FIG. 2.

During the positive phase of CLK1, AZL2 appears on the AX/AZL2 and the AY/AZL2 address buses and contains the destination address of the data on DZL1. During the negative phase of CLK1, AX appears on the AX/AZL2 bus and AY appears on the AY/AZL2 bus. AX and AY serve as source addresses for the data that will appear on the DX and DY data buses An internal, 16-bit bus is routed throughout the ASIC 20 connecting the outputs of certain circuits. An example of an output connected to the readability bus is shown in FIG. 5. It is desirable to read certain values in the computer that are normally not available to the programmer. This capability is accomplished by connecting these outputs onto a tristate bus designated as the "readability bus," which terminates as one of the inputs to the X operand multiplexer. The readability bus will supply the current value of these outputs as an X operand to the following listed components when they are properly addressed:

a. Timers
b. Threshold latches
c. Mask registers
d. Top of interrupt processor status stack and status flags
e. Output of interrupt address RAM
f. Top of program stack
g. Timer mode register
h. Divider remainder The system clock processor 33 provides TIMER CLK, CLK1, RESET, PH_A and PH_B signals to the timer and comparator block 42. The timer and comparator block 42 also receives inputs from the mathematical computation circuitry and multiplexing circuitry 40 via the AX operand address bus and the AX/AZL2 address bus. The timer and comparator block 42 receives a timer/latch value from the mathematical computation circuitry and multiplexing circuitry 40. The timer and comparator block 42 also send the TIMER INTERRUPT signals to an external source (not shown).

An output of the timer and comparator circuits 42 is a latch/time output signal that is input to the mathematical computation circuitry and multiplexing circuitry 40.

The program counter 34 of the ASIC 20 generates a new 13-bit address for the external program PROM 36 at the beginning of each instruction cycle. The program PROM 36 returns a 48-bit program word to the ASIC 20.

Still referring to FIG. 2, in response to an external interrupt input the interrupt processor 44 generates an interrupt vector. A separate interrupt vector is generated for each interrupt. The interrupt vectors are sent to the address ports of the interrupt address RAM 46. The internal interrupt address RAM contains the address for the interrupt service routine associated with the interrupt vector.

The interrupt address for a particular interrupt service routine is loaded from the interrupt address RAM 46 into program counter 34. The interrupt address lookup RAM must be loaded with the proper interrupt addresses as part of the initializing software following power-up.

The program counter 34 preferably is a 13-bit register that changes its output value unconditionally upon every clock cycle. It is clocked by the SNEW signal. The program counter 34 instigates every branching decision and computation in the ASIC 20.

The 13-bit program counter output signal from the ASIC 20 becomes the address of the program PROM 36. The program word located at a particular address in the program PROM 36 is sent back to the ASIC 20 for execution. The 13 bits give the program counter and branching circuitry 34 the capability to address 2E13 (8,192) words of program PROM 36.

In the absence of a branching instruction or interrupt, the program counter and branching circuitry 34 output is sequential. Upon occurrence of a branch instruction or interrupt, the program counter and branching circuitry 34 is loaded with a non-sequential value. This value becomes the address of a subroutine or an interrupt service routine located somewhere in the program PROM 36.

There are four types of branching instructions:

a. Calls
b. Jumps
c. Return from subroutines
d. Return from interrupts (RETI)

Each type of branch instruction has six variations:

a. =0
b. 0 c. $<0$
d. $\geqq 0$
e. Overflow
f. Unconditional

The four types of branching, with six variations of each type, result in $6\times4=24$ branching combinations.

Upon a call to a subroutine, the return address is first stored on a 64 word deep program status stack (not shown). If errant software causes the program stack pointer to overflow or underflow, an internal trap function causes a trap vector stored in the interrupt address RAM 46 to be loaded into the program counter and branching circuitry 34 on the next instruction cycle. The trap vector is user programmable.

the conditional branching is dependent upon three status bits from the computational circuitry of the microprocessor 20:

a. $\neq 0$ or $=0$
b. $<0$ or $\geqq 0$
c. Overflow

If the requirements of a conditional branch instruction are met or an unconditional branch instruction is executed, the new program address is loaded into the program counter and branching circuitry 34 for the instruction immediately following the branch instruction. There are no pipeline breaks caused by branch instructions.

Both the top of the program stack and the latest values of the status bits are addressable and available as X operands to the internal data mathematical computation circuitry and multiplexing circuitry 40.

The mathematical computation circuitry and multiplexing circuitry 40 includes multiplication, division, square-root calculation, barrel shifting, Boolean operations, addition, and subtraction.

The ASIC 20 preferably contains an on-board, $16\times16$-bit multiplier (not shown) that is capable of four-quadrant multiplication. Both of its operands must be in twos complement form, which gives a 32-bit result. However, overflow circuitry following the multiplier will indicate overflow for results greater than 16 bits. This overflow indication gives the software programmer the ability to make a conditional branch to a scaling subroutine. The greater-than-16-bit multiplier result can be scaled by the divider or barrel shifter such that a smaller 16-bit result on the DZ data bus can be stored in the internal data RAM 48.

Any multiply instruction will result in latching all 32 bits of the multiplier output and making the least significant half (LSH) of the multiplier output available to all components of the mathematical computation circuitry (square root, divider, barrel shifter, ALU, and multiplier). However, the most significant half (MSH) of the latched multiplier output is available to only the divider and the barrel shifter. The multiplier output is commonly called the product register. The MSH of the product register can be independently loaded with a value from the 16-bit DZ data bus. This feature enables the programmer to easily load the product register with a specific bit pattern.

Figure 3:
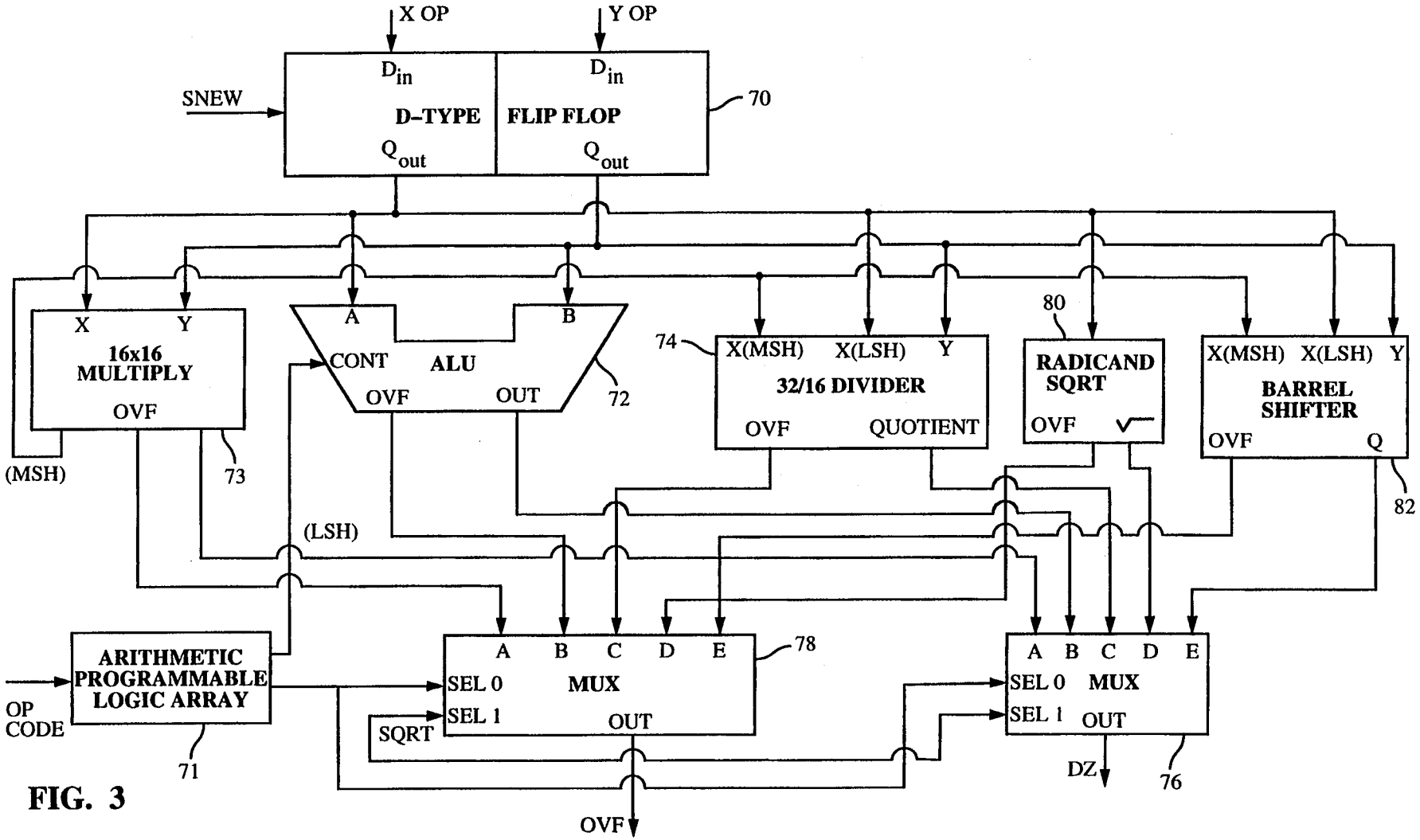
FIG. 3 illustrates mathematical computational components that may be included in the circuit of FIG. 2.

The mathematical computation circuitry 68 that my be included in the ASIC 20 is represented in block diagram form in FIG. 3. The divided circuit 74 will operate on a 32-bit dividened (numerator) and a 16-bit divisor (denominator) and give a 16-bit quotient with a 16-bit remainder. The remainder is used to round up the quotient if it is of sufficient magnitude.

The X and Y-operands are input to a D-type flip-flop 70, which also receives the timing signal SNEW from the system clock processor 33. The X and Y-operands are input to an arithmetic logic unit (ALU) 72. An arithmetic programmable logic array 71 receives an OP CODE signal from the program PROM 36 and outputs a signal to the ALU 72 indicating whether to perform addition, subtraction, or a Boolean operation. The X and Y-operands are also input to a multiplier 73, which provides the most significant half of the X-operand to the divider 74. The Y-operand and the least significant half of the X-operand are separately input to the divider 74.

The divider 74 is capable of four-quadrant division of a 32-bit dividend by a 16-bit divisor. The result is a 16-bit quotient and a 16-bit remainder. The divider 74 preferably automatically rounds up the quotient. If the remainder is greater than half of the divisor, the quotient will be incremented. The quotient is available on the DZ and DZL1 data buses, and the remainder is accessible to the programmer via the readability bus. The circuitry is designed to calculate X/Y or Y/X according to the programmer's needs.

The divider 74 outputs the quotient to a multiplexer 76 and outputs an overflow bit to a multiplexer 78. Even through the X operand is only 16 bits, the divider has the capability for a 32-bit dividend. If the multiplier operates on two inputs whose magnitudes are of sufficient quantity such that their product requires greater than 16 bits, the software programmer can detect this situation by monitoring the multiplier OVF bit. If the OVF bit is set, all 32 bits of the multiplier may be scaled by an integer number with the divider such that the result can be represented in only 16 bits.

The divider 74 preferably is an unclocked array of adder/subtracter elements. This type of design has a speed advantage over clocked, state-machine-type designs. To further increase speed, the design is preferably based on a non-restoring, binary division algorithm. A non-restoring algorithm is faster than a restoring algorithm, but it requires much more physical area to implement.

FIG. 3 also includes a square root extractor 80. The square root extractor 80 will operate only on the 16-bit X operand from the output of the flip flop 70. The square root extractor 80 will calculate an 8-bit integer square root with an 8-bit remainder. If the remainder is of sufficient magnitude, the square root will be rounded up.

For instance, SQRT (81)=9 RO and SQRT (100)=10 RO, and the answers will be given as 9 and 10 respectively. The SQRT (90) is 9R9=9.49. In this case, the answer will be given as 9 since the remainder was equal to or less than the integer square root. However, SQRT (91)=9R10=9.54, and the answer will be given as $9+1=10$. In the second case the integer square root was incremented because the remainder was greater than the integer square root.

The X operand is an integer, twos complement number. The square root extractor 80 will give correct answers for positive radicands only; however, it recognizes negative, tows complement numbers and will set the overflow bit (OVF) on detection of such numbers.

The square root circuit design is also based on an unclocked array and uses a non-restoring type algorithm. The algorithm for square root extraction requires a multiplexer for each add/substract element in the unclocked array.

The dividend, divisor, and quotient are two complement, binary numbers. The dividend and divisor will be integers. Their binary points will be to the right of their least significant bits (LSBs).

the underlying principle of operation of the divider 74 and the square root extractor 80 is non-restoring binary division. The divider 74 has a correction circuit that will correct the sign of the quotient for all sign combinations of the dividend and divisor. The divider 74 may be realized with sixteen, 16-bit adder/substracter stages (not shown). The first fifteen stages derive the quotient and remainder bits, and the last stage corrects for sign.

The divider 74 has the ability to detect quotient overflow resulting from maximum negative quotient, division by zero, or maximum negative dividend. Positive overflow is also detected if the resulting quotient is too large to be represented by a 16-bit, twos complement number.

The ALU 72 provides Boolean arithmetic, addition and subtraction capability. Both inputs to the ALU 72 preferably are 16 bits. For arithmetic operations, the inputs must be twos complement. The ALU 72 is capable of generating an overflow output for all operations except Boolean operations.

Referring still to FIG. 3, the mathematical computation circuitry 68 preferably contains a barrel shifter 82 of limited capability. The barrel shifter 82 receives the Y-operand and the MSH and LSH of the X-operand. The barrel shifter 82 provides an overflow output to the multiplexer 78 and a Q output to the multiplexer 76.

The barrel shifter 82 can do a logical right shift on a 32-bit operand. The amount of bits to be shifted is determined by the software and can be from 0 to 16 bits in a signal instruction cycle. The 32-bit operand can be positive or negative. The AX bus contains (or points to) the 16-bit operand. The AY bus value indicates the number of bits the 16-bit operand is to be shifted right. The barrel shifter provides an overflow output that will be a helpful to the programmer in determining if the magnitude of the right shift operation is large enough for the numerator involved. The overflow output will signify quotient overflow. The number of bits right-shifted is actually a denominator that characteristically has a positive power of 2. The 32-bit numerator could be a large enough magnitude, and the denominator could be small enough, such that the 16-bit quotient would not contain all of the MSBs in the original numerator. The only way the barrel shifter overflow will be asserted is when the operand is from the 32-bit product register. If the operand is from the 16-bit data bus, the OVF will never be generated, regardless of the number of right shifts.

Figure 4:
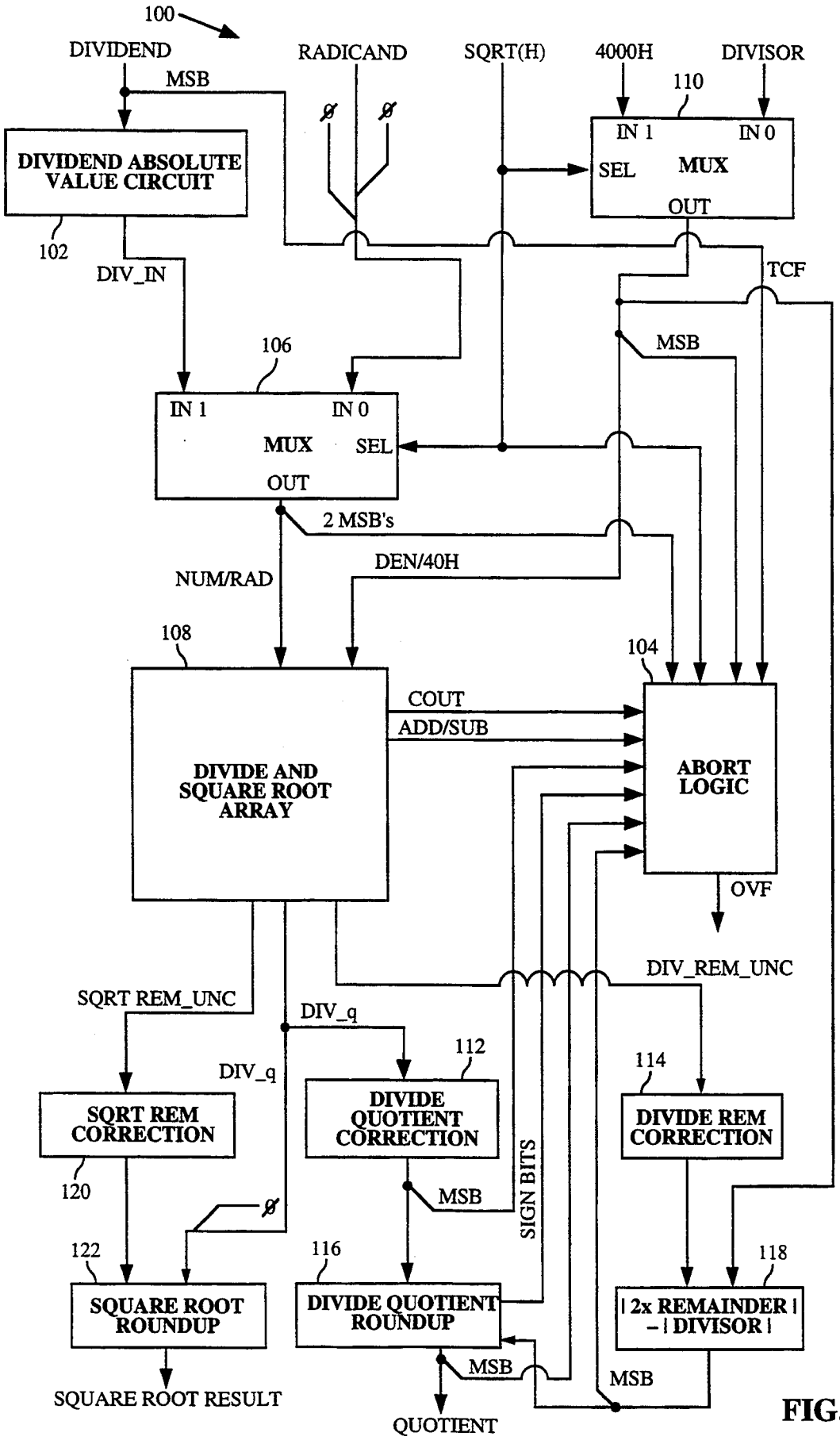
FIG. 4 illustrates combined square root and divider circuits that may be included in the circuit of FIG. 2.

FIG. 4 is the block diagram of the combined square root 80 and divider circuit 74 that is actually implemented in the ASIC 20. The dividend is input to a dividend absolute value circuit 102. The most significant bit of the dividend is input to an abort logic circuit 104. The absolute value of the dividend is input to a multiplexer 106, which directs the absolute value to the dividend to a divide and square root array 108. The divide and square root array 108 contains necessary adders (not shown) and multiplexers (not shown) for doing division or square root calculations in a shared circuit. The divisor is input to a multiplexer 110, which provides the divisor to the divide and square root array 108.

When doing division, the divide and square root array 108 outputs signals to a divide quotient correction circuit 112 and to a divide remainder correction circuit 114. The divide remainder is input to a subtraction circuit 118 that subtracts the absolute value to the divisor from the absolute value to twice the remainder. The output of the circuit 118 is input to the divide quotient roundup circuit 16. The most significant bit of the divide quotient correction is provided to the abort logic circuit 104. The divide quotient is input to a divide quotient roundup circuit 116, which produces the quotient and directs the most significant bit of the divide quotient and its sign bits to the abort logic circuit 104.

When performing square root calculations that combined square root and divider circuit 110 receives the radicand in the multiplexer 106. An instruction SQRT(H) from external control circuitry (not shown) is input to the multiplexer 106 and to the abort logic circuit 104. The abort logic 104 monitors signals throughout the combined square root and divider circuit 100 for both division and square roots and asserts the overflow signal is necessary.

The output of the divide and square root array 108 is directed to a square root remainder correction circuit 120 and to a square root roundup circuit 122. The remainder correction is combined with the output to the divide and square root array 108 in the square root roundup circuit to produce the square root result.

The combined square root and divider circuit 100 will process a 16-bit radicand yielding an 8-bit square root) or a 32-bit dividend and a 16-bit divisor (yielding a 16-bit quotient with an 16-bit remainder). The 16-bit radicand must be packed with zeros such that it is converted to a 32-bit number having an MSB=0, 16-bits of radicand and 15 LSBs=0. This zero packing is necessary so that the radicand and dividend can share the same circuitry in the divide and square root array 108. The zero packing is done inside the ASIC.

The computation circuit provides status bits that describe the mathematical computation of the current clock cycle. These status bits are:

a. $\neq 0$, $=0$
b. $\geqq 0$, $<0$
c. overflow (OVF)

These status bits are latched at the end of every arithmetic instruction and sent to the branching circuitry. Latching the status flags allows multiple, successive branch instructions that refer to the same status flag generated by the last computational instruction. When the last arithmetic instruction was a multiply, the latched status bits are valid for the complete 32-bit output of the multiplier.

Each of the two operands (X & Y) for the multiplier, divider, square-root extractor, barrel shifter, and ALU can come from various sources. The 16-bit X operand can be source from AX, DX, DZ, the readability bus, or the fed-back output of the multiplier. The 16-bit Y operand can be sourced from AY, DY, or DZ. The choice of the X and Y source operand is selected by a multiplexer located in front of the multiplier, divider, ALU, barrel shifter, and square root extractor. The output of the multiplexer is clocked into the D-type register 70.

The timer section timer and comparator block (42) preferably includes six digital timers, six storage latches, a 6-bit control register, and six digital comparators. The logical relationship among these components for one timer is illustrated in FIG. 5.

The destination address and CLK 1 signals are input to a destination address decoder 132. The destination address decoder 132 provides an enable signal to the enable terminals of a control latch 134 and a timer 136. The destination address decoder also provides enable signals to five other timer enable inputs (not shown) and to five other latch enable inputs (not shown). These other timers and latches are identical to the timer 136 and the latch 134.

The timer 136 is controlled by one bit of the control register or latch 134. The timer 136 receives a TIMER_CLK signal from the system clock processor 33 of FIG. 2. If the control bit from the latch 134 is a "1", the timer 136 will count up with each cycle to TIMER_CLK. The signal TIMER_CLK is derived from the TIMER CLOCK input to the system clock processor FIG. 2 and is synchronized with Ph_A, Ph_B, and CLK 1. If a bit in the control register is a "0", the timer will stay reset.

The output of the the destination address decoder 132 is also input to a storage latch 138. The storage latch 138 is programmed with a threshold value that is continuously compared by a comparator 140 with the output of the digital timer 136. If the timer value of a timer 136/latch 138 pair is greater than or equal to the corresponding latch 138, the output of the comparator 140 will be asserted high. The output of the comparator 140 is applied to a transparent latch 142, which also receives the CLK 1 input at its enable terminal. The transparent latch 142 allows its input data to propagate to the output when the CLK 1 input at its enable terminal input is HIGH.

The output of the timer 136 is input to a tri-state driver circuit 146 for the readability bus.

A source address decoder 144 decodes a source address signal and generates one enable signal for the tri-state driver circuit 146 or for the tristate drivers for the five other timer outputs or the five other control latch outputs.

In the timer and comparator block 42 six digital comparators compare six timer/latch pairs. The comparators always reflect the relative value between the timer and latch. If a timer value is larger than the latch value, the comparator output will be asserted. However, if the latch of the same timer/latch pair is programmed with a value higher than the present timer value, the comparator output will become deasserted. Each timer and corresponding threshold latch is 16 bits wide. The timer control register is 6 bits wide, one bit for each of six timers.

FIG. 5 is a logical representation of the timer section, but does not reflect the actual physical implementation. The actual timer and latch values are stored in a small random access memory (RAM) and periodically recalled for comparison and timer incrementing.

It was desired that the timer section be highly visible to the programmer. To achieve this visibility, the timer section was extensively memory-mapped. All six threshold latches, all six timers, and the control register are programmable. Additionally each of their outputs in readable and visible on the external data bus. The programmability and readability functions are under program control.

Each of the values is read by providing the proper source address to the source address decoder 144 of FIG. 5. The output of the source address decoder 144 will then enable the proper tristate driver. To program a certain register, the proper address must be applied to the destination address decoder and the desired data applied to the data bus. The output of the destination address decoder will enable the proper component to accept the data.

The internal data RAM 48 in the ASIC 20 is preferably an internal 256 word×16 bit, dual-port RAM. Referring to FIG. 2, the two address ports are connected to the AX/AZL2 and AY/AZL2 address buses. The outputs of the internal data RAM 48 are connected to the DX(NT) and DY data buses. Data from the DZL1 bus is written to the input port of the RAM.

The microprocessor 20 provides for RAM expansion by routing the AX/AZL2 address and DX, and DZL1 data buses to I/O pads.

Figure 6:
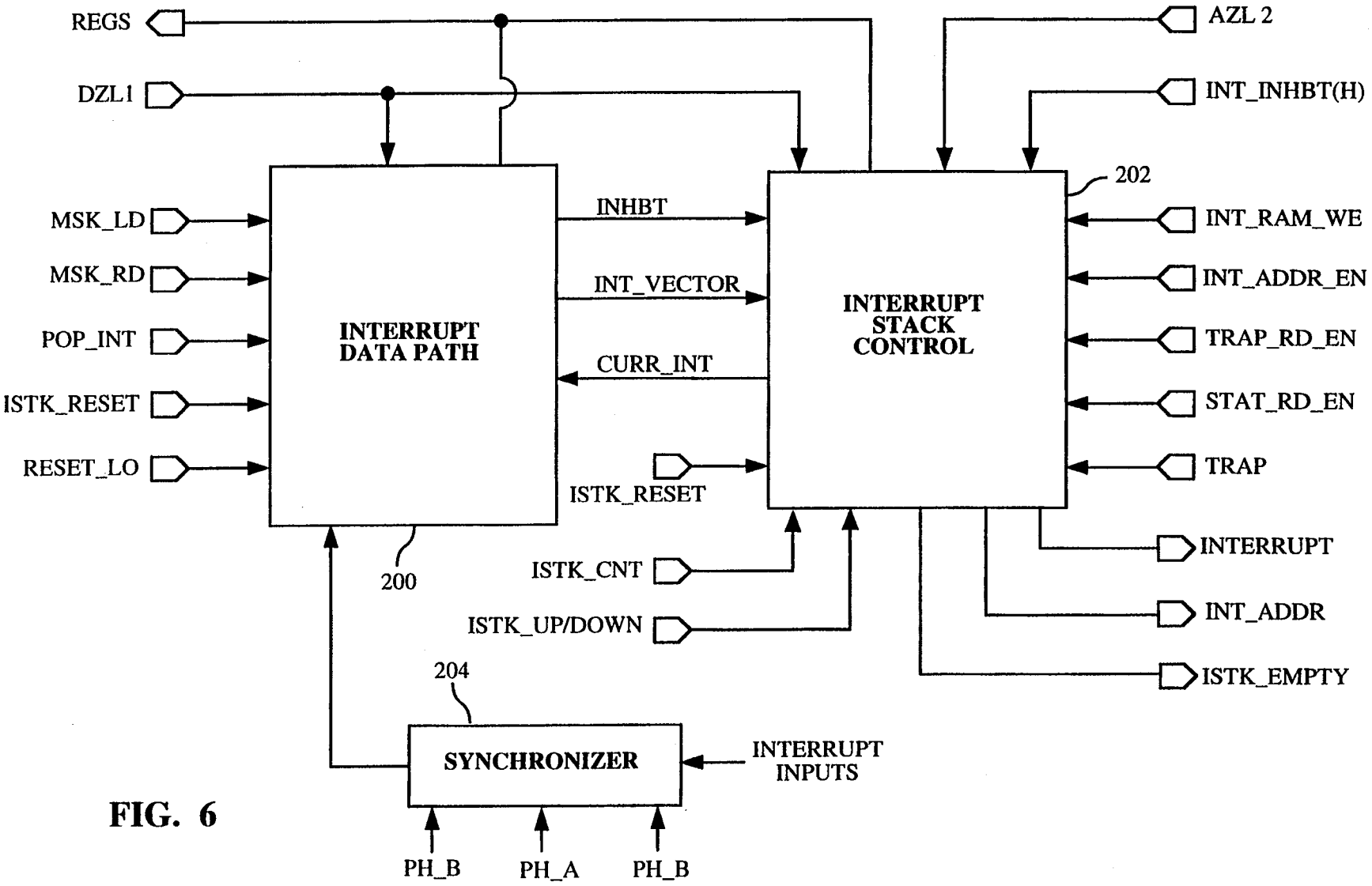
FIG. 6 is a generalized block diagram of an interrupt processor that may be included in the circuit of FIG. 2.

Referring to FIGS. 2 and 6, each interrupt signal has a different priority within the interrupt processor 44. Each interrupt input can be masked by the computer program. When conditions are correct, the interrupt processor 44 will send an interrupt request to the program counter and branching circuitry 34. The interrupt address RAM 46 is preferably an internal, 13-bit by 24 word RAM. Each interrupt is associated with a unique 5-bit interrupt vector. This 5-bit vector is decoded by the interrupt address RAM 46 to yield the starting address for the interrupt service routine. The interrupt address RAM 46 can be programmed with 23 unique interrupt-routine addresses by the computer program. The interrupt address RAM 46 also contains a trap address which is also user programmable. This address is loaded into the program counter and branching circuitry 34 is any of the two stacks in the ASIC 20 under flow or overflow.

When an interrupt service routine is finished, the program counter and branching circuitry 34 must indicate completion to the interrupt processor 44 by asserting the return-from-interrupt (RETI) signal.

Some software instructions in the program cannot be interrupted. Among these are branch instructions. The most significant bit (MSB) of the 48-bit instruction word is asserted if that instruction is not to be interrupted. This interrupt inhibit bit goes to the interrupt processor 44 to inhibit interrupt requests for one clock (CLK 1) cycle.

A general block diagram of the interrupt processor 44 is shown in FIG. 6. The interrupt processor 44 can be subdivided into an interrupt data path 200 and an interrupt stack control 202.

Most of the signal I/O lines of the interrupt processor 44 are sourced from or destined for other parts of the ASIC 20 circuitry. However, some signal paths between the sections of the interrupt processor or from outside the ASIC are present.

The only signals the interrupt processor 44 receives from a source external to the ASIC 20 are the actual interrupt signals. The 23 separate interrupt inputs are synchronized with the clocking regime by means of an internal synchronizer 204.

DZL1 is part of the 16-bit data bus within the ASIC 20 and will carry data to be loaded into two mask registers (not shown) contained within the interrupt data path 200. DZL1 also is used to load the interrupt address RAM 46 with the interrupt service-routine addresses. The interrupt address RAM is addressed by AZL2.

When interrupts are received, the interrupt address RAM 46 depicted in FIG. 2, will eventually output the address of the first instruction for the associated service routine located in the program PROM 36 assuming a higher priority interrupt is not currently executing.

These addresses will be loaded into the program counter and branching circuitry 34.

The interrupt processor 44 can process a total of 23 external interrupts. The external interrupt input pulse width must be ≧1.5 periods of CLOCK IN. All 23 external-interrupt inputs are edge-activated by the low-to-high transition of a pulse. Once an interrupt has been processed, it will not be recognized again by the ASIC 20 until another low-to-high transition of the interrupt input.

If an interrupt input becomes asserted and is not masked out by the mask registers, a corresponding bit with a 23-bit storage register (not shown) will be set. This bit will remain set until the corresponding interrupt-service routine is completed by the ASIC 20. If the external interrupt signal becomes inactive before the corresponding interrupt service routine is executed (because a higher priority interrupt is being executed), the ASIC 20 will "remember" to execute the routine because the bit within the storage register is set. A return to interrupt signal (RETI) within the interrupt software routine will clear the bit.

The external interrupt inputs may be generated asynchronously with the system clock input. The internal interrupt processor 44 will synchronize the interrupt inputs. The synchronizers may include three latches connected in series. Each latch is clocked with an alternate phase of the clock.

The interrupt processor 44 includes a priority encoder that generates a 5-bit code that is dependent upon the bit pattern of the 23 inputs. This 5-bit code is the interrupt vector. The priority encoder is programmed to recognize which of the 23 inputs has the highest priority and to output an interrupt vector unique to the highest priority input that is presently asserted. Each interrupt input is internally assigned an individual priority ranging from 1 to 23, with 1 being the highest priority.

As shown in FIG. 2, this 5-bit interrupt vector addresses the internal interrupt address decoding RAM 46. The 13-bit interrupt address RAM 46 output is the address of the interrupt software service routine located in the program PROM 36. The interrupt processor works on a queue system. If an interrupt occurs, and no other interrupt of higher priority currently is being serviced by the software, the interrupt will result in an interrupt request being sent to the branch control logic; otherwise that interrupt must wait in the queue.

To accomplish the queueing system, the interrupt processor 44 has an interrupt status stack (not shown) that operates under the control of the interrupt stack control 202. This stack contains the lower priority interrupt vectors that have been interrupted by interrupts of higher priority. The stack holds the interrupt vectors of the lower priority interrupts until the higher priority interrupt service routines are finished.

If an external interrupt becomes asserted and its priority happens to be higher than the priority of the interrupt service routine, that the computer happens to currently be executing, the priority encoder output will change to reflect the unique interrupt vector of the higher priority interrupt. This new interrupt vector will be compared with the current output of the status stack. The interrupt vector value (V) will be greater than the status stack output (S), which will cause the new interrupt vector (corresponding to the newly asserted external interrupt input) to be stored on the status stack. The computer will then be forced to execute the interrupt service routine for the newly asserted interrupt input.

The two mask registers can be programmed one at a time by program software. The registers are programmed in the same way as the external data RAM. The destination address of the mask register of interest is put in the Z field of the program word. The opcode and X and Y fields of the same program word are chosen such that the desired mask register contents will appear on DZL1 when the mask register address appears on the AZL2 address bus. The mask registers are memory-mapped within the ASIC20 address space. The addresses of the two mask registers are shown in Table 1.

One or more interrupts can be disabled as directed by the software. All 23 external interrupts can be masked by writing a 12-bit value to the two mask registers. To enable a certain interrupt, the programmer must write a "1" to the corresponding bit in one of the two mask registers. The MSB of one of the mask registers will totally disable all 23 interrupt inputs if it is set to a "1". If it is set to a "0", the 23 interrupt inputs will be enabled or disabled according to the way the remaining bits in the mask registers are set. This MSB is known as the global enable bit. The second MSB of one of the mask registers enables or disables the highest priority interrupt. The LSB of the other mask register enables or disables the lowest priority interrupt input. The remaining interrupt inputs are enabled or disabled by the remaining mask register bits, with descending interrupt priority. The polarity of the individual interrupt-enable bits is opposite to the polarity of the global interrupt-inhibit bit. If an interrupt control bit is a "1", the corresponding interrupt will be enabled. If an interrupt control bit is a "0", the corresponding interrupt will be disabled.

Errant software may cause both the interrupt processor status stack and the program stack to underflow by executing too may RET or RETI instructions. Additionaly, more than 64 return addresses generated by CALL instructions will cause the program stack pointer to overflow.

The interrupt processor can be inhibited in three ways:

a. Hardware-initiated interrupt inhibit
b. Software-initiated interrupt inhibit
c. Global hardware inhibit during power-up The hardware-initiated interrupt disable results when the MSB of the instruction word is asserted. The MSB of the instruction word is asserted if a branch instruction has been output from the program PROM, of if a reference to any of the indirect addressing registers (contained elsewhere within the ASIC 20) exists in an instruction word. Due to the architecture of this ASIC 20, conditional branch instructions cannot be interrupted.

The software program can disable the interrupt processor 44 by setting the MSB of the second mask register at RAM address 0012AH. Both mask register are only 12 bits wide. If the MSB of the second mask register is a "1", all interrupts are disabled. This has been explained earlier.

The software can also disable the interrupt processor 44 using the reset interrupt processor (RI) instruction. The RI instruction will reset the interrupt processor by resetting the interrupt processor status stack and clearing all the interrupt input latches.

Finally, it is desirable to disable the interrupt processor 44 when power is first applied to the ASIC 20. This operation gives the ASIC 20 a chance to execute initializing and "housekeeping" software before being bothered by any interrupts. When power is applied to the ASIC 20, a power-up reset signal is applied to various locations in the microprocessor 20. The power-up reset signal will clear the mask registers, all interrupt input latches, and the interrupt status stack.

Important outputs of the interrupt processor can be monitored by the program software. This monitoring function is accomplished by tristating these outputs onto the 16-bit readability bus. Each of the following outputs of the interrupt processor preferably are memory-mapped within the ASIC20 internal-register address space:

a. Mask register 1;
b. Mask register 2;
c. Interrupt address RAM output;
d. Status stack output; and
e. Trap-address register output.

To determine the value of a desired interrupt processor output, the program software must contain an instruction whose AX source address corresponds to the desired output. An AX decode circuit will enable the correct tristate driver, causing the output of interest to appear on the 16-bit readability bus. The value of the selected interrupt processor output will appear on the DZL1 data output bus two instruction cycles later.

Figure 7:
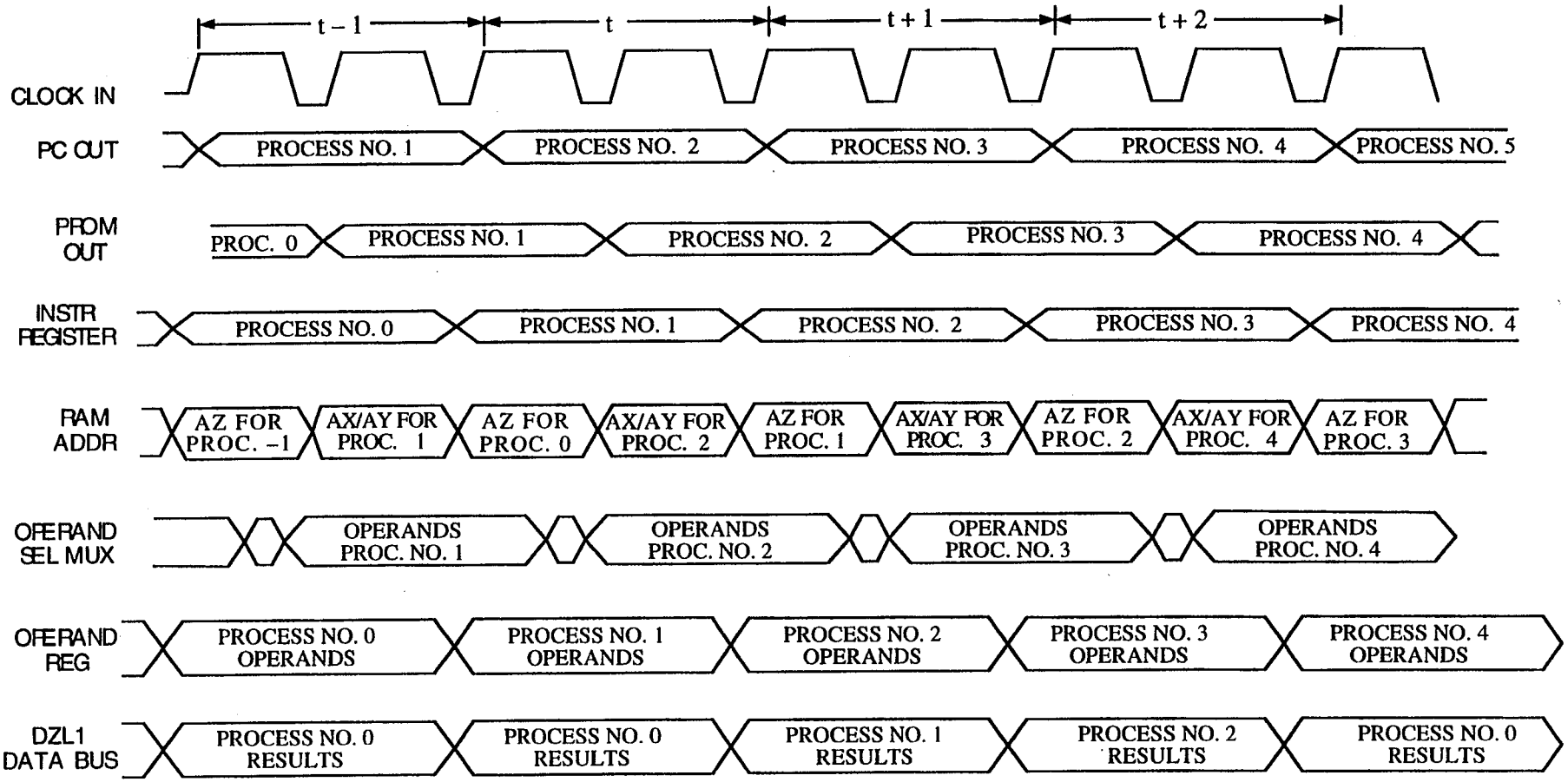
FIG. 7 is a timing diagram for the application specific integrated circuit of FIG. 1.

The overall operation of the ASIC 20 is shown by the general process timing diagram of FIG. 7. FIG. 7 illustrates the output of some important signal nodes in the ASIC 20.

There are two ways of viewing the timing diagram. The first is to follow a process number and see what happens to it during consecutive clock cycles. The second way is to observe all the events happening simultaneously during any one clock cycle. Both methods of explanation will be used herein.

At the clock cycle (t−1), process no. 1 is generated at the output of the program counter 34 and (after some PROM access time) is realized as an instruction word at the output of the program PROM 36. Any X and Y operands required for process no. 1 are fetched during the second half of time t(−1).

At time t, process no. 1 is clocked into an instruction register. If process no. 1 is a computational instruction (arithmetic or a logical), the proper computation is executed using a value stored in the operand register.

At time t+1, the result of the process no. 1 computation (appearing on DZL1 Data Bus) is written to a destination address during the positive phase of the clock cycle. Therefore, two and one-half clock cycles are required from the formulation of an instruction to its completion. The destination could be internal of external RAM, output, ports, internal timers or latches, or the internal mask registers.

The following description uses the second method viewing the timing diagram. Note that during any one clock cycle, four events are happening simultaneously. For explanation purposes, assume the current clock cycle is at time t.

First of all, the next instruction is generated by the program counter 34 to generate a new address for the external program PROM 36. The program PROM 36 outputs the instructions (after some access time delay) to be executed at the beginning of the next clock cycle, t+1.

Secondly, the instruction register has just clocked in and commenced execution of the current instruction. This current instruction had been prefetched from program PROM 36 during the previous (t−1) clock cycle. The current instruction being executed uses the operands clocked into the operand register. These operands have also been prefetched during the second half of the previous clock cycle (t−1) by controlling an operand select MUX (not shown) in the mathematical computation circuitry and multiplexing circuitry 40 to channel the correct operands into the operand register. The third simultaneous event during the present clock cycle is writing the results (appearing on the DZL1 Data Bus) of the previous phase of the current clock cycle. The DZL1 Data Bus is the input of the RAMs, and the AZL2 address bus is multiplexed (with either the AX or AY address buses) to the address ports of the internal RAM. Both the AZL2 address and DZL1 data buses were latched at the end of the previous clock cycle to make stable data available to the RAM for writing during the current clock cycle.

The fourth simultaneous event to happen is prefetching of the operands for the next instruction. Remember that next instruction has just been generated during this same clock cycle. During the negative phase of the current clock cycle (t), the X and Y address buses are applied to their respective RAM address ports. The operand select MUX is controlled to channel the proper source of the opernads to the input of the operand register. The instruction register will clock in these operands upon the rising edge of the next clock cycle (t+1).

The following table summarizes the instruction set of the ASIC 20. The left column is the digital code, and the right column is the mnemonic.

| Instruction Opcode | Mnemonic | |
|---|---|---|
| 1 000 00 0000 | >=0 | CALL |
| 1 000 00 0001 | >=0 | JMP |
| 1 000 00 0010 | >=0 | RET |
| 1 000 00 0011 | >=0 | RETI |
| 1 000 00 0100 | <0 | CALL |
| 1 000 00 0101 | <0 | JMP |
| 1 000 00 0110 | <0 | RET |
| 1 000 00 0111 | <0 | RETI |
| 1 000 00 1000 | =0 | CALL |
| 1 000 00 1001 | =0 | JMP |
| 1 000 00 1010 | =0 | RET |
| 1 000 00 1011 | =0 | RETI |
| 1 000 00 1100 | NEO | CALL |
| 1 000 00 1101 | NEO | JMP |
| 1 000 00 1110 | NEO | RET |
| 1 000 00 1111 | NEO | RETI |
| 1 000 01 0000 | OVF | CALL |
| 1 000 01 0001 | OVF | JMP |
| 1 000 01 0010 | OVF | RET |
| 1 000 01 0011 | OVF | RETI |
| 1 000 01 0100 | CALL | |
| 1 000 01 0101 | JMP | |
| 1 000 01 0110 | RET | |
| 1 000 01 0111 | RETI | |
| 0 111 01 1000 | Z = &X/&Y | |
| 0 111 01 1001 | Z = X/&Y | |
| 0 111 01 1010 | Z = &X/Y | |
| 0 111 01 1011 | Z = X/Y | |
| 0 111 01 1100 | Z = &X*&Y | |
| 0 111 01 1101 | Z = X*&Y | |
| 0 111 01 1110 | Z = &X*Y | |
| 0 111 01 1111 | Z = X*Y | |
| 0 111 10 0000 | Z = &X+&Y | |
| 0 111 10 0001 | Z = X+&Y | |
| 0 111 10 0010 | Z = &X+Y | |
| 0 111 10 0011 | Z = X+Y | |
| 0 111 10 0100 | Z = &X−&Y | |

-continued

| Instruction Opcode | Mnemonic |
|---|---|
| 0 lll 10 0101 | Z = X−&Y |
| 0 lll 10 0110 | Z = &X−Y |
| 0 lll 10 0111 | Z = X−Y |
| 0 lll 10 1000 | Z = &X OR &Y |
| 0 lll 10 1001 | Z = X OR &Y |
| 0 lll 10 1010 | Z = &X OR Y |
| 0 lll 10 1011 | Z = X OR Y |
| 0 lll 10 1100 | Z = &X XOR &Y |
| 0 lll 10 1101 | Z = X XOR &Y |
| 0 lll 10 1110 | Z = &X XOR Y |
| 0 lll 10 1111 | Z = X XOR Y |
| 0 lll 11 0000 | Z = &X AND &Y |
| 0 lll 11 0001 | Z = X AND &Y |
| 0 lll 11 0010 | Z = &X AND Y |
| 0 lll 11 0011 | Z = X AND Y |
| 0 lll 11 0100 | Z = &X/$2^n$ |
| 0 lll 11 0101 | Z = X/$2^n$ |
| 0 lll 11 0110 | Z = SQRT(&X) |
| 0 lll 11 0111 | Z = SQRT(X) |
| 0 lll 11 1000 | Z = &X &Y |
| 0 lll 11 1001 | Z = X &Y |
| 0 lll 11 1010 | Z = &X Y |
| 0 lll 11 1011 | Z = X Y |
| 0 lll 11 1100 | Z = NOT(&X) |
| 0 lll 11 1101 | Z = NOT(X) |
| 0 000 11 1110 | Z = Rl |
| 0 000 11 1111 | Z = RSP |

NOTE:
l= 1 or 0 depending upon whether programmer wants the internal indirect address registers ($R_x$, $R_y$, $R_z$) to be used as source operands or destination.

The ASIC 20 preferably has a 48-bit word length. The instruction set includes five different types of instructions: arithmetic group, logical group, branch group, miscellaneous group and indirect group. The two operands for each type of arithmetic or logical instruction can originate from program PROM 36 or memory as X or Y, or from registers as $R_x$ or $R_y$. The arithmetic group of instructions includes add, subtract, multiply, divide and square root. The logical group of instructions includes AND, OR, EXCLUSIVE OR, and shift right. The branch group includes conditional and unconditional jump instructions, subroutine calls, returns from subroutine calls, and returns from interrupt instructions. The miscellaneous group includes reset stack pointer (RSP) and reset interrupt processor (RI).

Indirect operations can be performed on all the arithmetic and logical functions using any or all of three internal address registers ($R_x$, $R_y$, $R_z$). For example, an indirect Z=X+Y would add $R_x$ and $R_y$ together. A direct Z=X+Y would add the X and Y fields from the program ROM together.

An instruction word may include bits identified as follows:

| | |
|---|---|
| D | actual data from program ROM; |
| DI | disable interrupt; |
| I | indirect operation using $R_x$, $R_y$, $R_z$, |
| $R_x$, $R_y$, $R_z$ | operand registers of indirect instructions; |
| S | a location for external data RAM, ROM or input ports; |
| X | first source/data field; |
| Y | second source/data field; |
| Z | third field (for resulting data storage); |
| & | actual data from program ROM on address register; and |
| ! | used only in conjunction with the address registers. Denotes the address registers used as a memory address. |

A word may be formed with the bits having the following allocations:

| | | | | | | Operands | | Destination |
|---|---|---|---|---|---|---|---|---|
| | Dl | $R_x$ | $R_y$ | $R_z$ | Instruction | X | Y | Z |
| Bit field | 47 | 46 | 45 | 44 | 43–48 | 37–22 | 21–11 | 10–0 |

When DI=0 in bit 47, an interrupt will be allowed to occur. DI=1 does not allow an interrupt to occur. Bits 46- 44 are indirect registers with active high. Bits 42-38 specify the instruction. For example, 100000 is Z=&X+&Y; 100001 is Z=X+&Y; 100010 is Z=&X+Y; and 100011 is Z=X+&Y; 100010 is Z=&X+Y; and 100011 is Z=X+Y. The next 16 bits of the word, which are bits 37-22, contain the X operand, and bits 21-11 contain the Y operand. The last 11 bits contain the location Z of the result of the instruction operating on the operand.

For NOT and SQRT operations the word may be formed as:

| | Dl | $R_x$ | $R_y$ | $R_z$ | Instruction | Operand | 11 zeros | Destination |
|---|---|---|---|---|---|---|---|---|
| Bit field | 47 | 46 | 45 | 44 | 43–48 | 37–22 | 21–11 | 10–0 |

The word for NOT and SQRT has only an X operand. When bits 43-48 are 111101, the instruction is Z=NOT(X); and 111100 is Z=NOT (&X).

For branch operations, including, including Return From Interrupt, the word may be formed as:

| | Dl | $R_x$ | $R_y$ | $R_z$ | Instruction | 14 zeros | Destination | 11 zeroes |
|---|---|---|---|---|---|---|---|---|
| Bit field | 47 | 46 | 45 | 44 | 43–48 | 37–24 | 23–11 | 10–0. |

Interrupts will not be allowed to occur when a branch instruction is being executed. Therefore DI=1 for all branch instructions. Bits 46-44 will all be zeros because not indirect operations are allowed in the branch instructions. Bits 43-38 specify the instruction. For example, 000000 is Call >=0; 000001 is JMP>=0; 00010 is RET>=0; and 000011 is RETI>=0. Bits 23-11 specify the branch location applicable only to call and jump. Bits 37-24 and bits 10-0 are all zeros because these bits are not used by branch instructions.

For miscellaneous instructions (RSP and RI) the word may be formed as:

| | DI | $R_x$ | $R_y$ | $R_z$ | Instruction | 38 zeros |
|---|---|---|---|---|---|---|
| Bit field | 47 | 46 | 45 | 44 | 43–48 | 37–0 |

Interrupts will not be allowed to occur when an RSP or RI is being executed. Therefore DI=1 for all branch instructions. Bits 46-44 are zero because no indirect registers are used with RSP or RI instructions. Bits 43-38 specify the instruction; for example, 111111 is RSP; and 111110 is RI. The remaining bits are zero becauses they are not used by either RSP or RI.

The structures and methods disclosed herein illustrate the principles of the present invention. The invention may be embodied in other specific forms without departing from its spirit or essential characteristics. The described embodiments are to to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. An integrated circuit chip for application in a computer for performing high speed arithmetic operations in hardware, comprising:

a system clock processor circuit formed in the chip;

a timer circuit formed in the chip and connected to the system clock processor to receive clock signals therefrom;

a program counter and branching circuit formed in the chip and connected to the system clock processor to receive clock signals therefrom;

an interrupt processor circuit formed in the chip and connected to the program counter and branching circuit and to the system clock processor circuit to receive signals therefrom;

an interrupt address random access memory connected to the interrupt processor to receive an interrupt vector signal therefrom;

mathematical computation circuitry formed in the chip and connected to receive timing signals from the system clock processor and the timing circuit, and for performing instruction look-ahead to permit execution in one clock cycle, and connected to the timing circuit, the interrupt processor and the program counter and branching circuit to provide data thereto; and an internal data random access memory formed in the chip and connected to the mathematical computation circuitry and the interrupt address random access memory to exchange instructions and data therewith.

2. The integrated circuit chip of claim 1 wherein the mathematical computation circuitry includes a circuit for performing combined division and square root operations.

3. The integrated circuit chip of claim 2 wherein the circuit for performing combined division and square root operations includes:

means for processing a 32-bit numerator and a 16-bit denominator;

means for performing square root operations on a 16-bit radicand; and a 32-bit barrel shifter.

4. The integrated circuit chip of claim 1 including a fixed instruction set.

5. The integrated circuit chip of claim 4 further including means for executing each instruction in a single clock cycle.

6. The integrated circuit chip of claim 5 further including means for performing 16×16-bit multiplication to produce a 32 bit output.

* * * * *